United States Patent Office 3,352,781
Patented Nov. 14, 1967

3,352,781
STABILIZATION OF SILICONE FLUIDS
Fritz A. Buehler, Erlton, N.J., assignor to Mobil Oil Corporation, a corporation of New York
No Drawing. Filed Apr. 5, 1965, Ser. No. 445,787
12 Claims. (Cl. 252—37.2)

This invention relates to organopolysiloxane lubricant compositions. More particularly, this invention relates to silicone compositions having improved high temperature stability.

The development of silicone-containing lubricants and hydraulic fluids has been remarkably rapid in recent years and their use is now wide spread. Silicones have proven to be more stable than mineral oils and natural synthetic esters. However, with the increasing demand for lubricants capable of resisting still higher operating temperatures limitations on the use of silicones have been encountered. Organopolysiloxane fluids, such as alkyl polychlorophenyl silicone fluids, for example are generally stable for great lengths of time at temperatures around 200° F. However, at temperatures of 500° F. and higher, these silicones volatilize and gel at undesirable rates. At these elevated temperatures, the liquid silicones undergo a change in property, particularly when exposed to the air for extended periods of time. The liquid becomes increasingly more viscous until complete gelation occurs. This is, of course, particularly undesirable in lubricants used for hydraulic and lubricating purposes.

It has been customary in the past to improve the extreme high-temperature stability by the addition of stabilizing agents to the silicone. Additives, including iron compounds, such as iron oxide and iron octoate, have been used with some success. However, these mixtures have often resulted in the formation of haze, and also gelation at high temperatures, e.g. 500° F., still occurs too rapidly.

Accordingly, it is an object of this invention to provide improved silicone lubricants which exhibit a resistance to increasing viscosity and an exceptionally low rate of gelation at temperatures of about 500° F. and higher. Other objects will become evident from the hereinafter description.

It has now been discovered that compositions may be stabilized against the gelling effects of high temperature conditions by the incorporation therein of a minor amount of certain sulfur-containing compounds. These sulfur compounds are: diphenylthiourea, thiophenol, including alkyl thiophenols and mixed-alkyl thiophenols, diphenyldisulfide, tetraethyl-thiuramdisulfide and sodium mercapto-benzothiazole.

Surprisingly enough these sulfur compounds by themselves evaporate in a few hours upon exposure to 500° F. However, in combination with the silicone fluids, they are remarkably effective. The silicone fluids which are conventionally formulated to contain a minute amount of a stabilizer, usually iron oxide, or an iron salt of an organic carboxylic acid, such as iron octoate, are rendered surprisingly enough so more heat stable at high temperatures by the addition of the sulfur compounds of this invention as to indicate a synergistic combination.

The specific compounds of this may be combined with the silicone fluid by any convenient mixing means. I prefer moreover to add from about 0.01% to about 10% of the sulfur additive by weight of the total silicone fluid composition.

The sulfur compounds of this invention have the following chemical structures.

Diphenylthiourea:

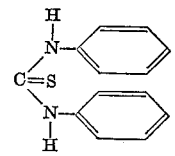

Thiophenol:

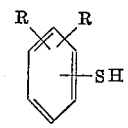

wherein R may be hydrogen or alkyl of 1 to 5 carbon atoms, and preferably methyl Diphenyldisulfide:

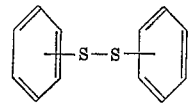

Tetraethyl thiuramdisulfide:

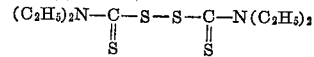

Sodium salt of mercaptobenzothiazole:

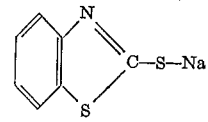

With regard to the thiophenol, mixed-alkyl thiophenols wherein the R groups are the same or different, or two or more different thiophenols may be used.

The silicone fluids which are stabilized in accordance with this invention are condensation products obtained by hydrolyzing compositions comprising one or more organosilicone halides having the general formula $$R_nSiX_{4-n}$$

wherein R represents a hydrocarbon radical selected from the group consisting of alkyl, aryl, alkaryl, aralkyl and halogenated derivatives thereof, X represents a halogen atom and $n$ is an integer of at least one and not more than 3. Also included herein are the copolymeric siloxanes, such as those having haloaryl and alkyl radicals attached to the silicon atoms.

A preferred group of polymers formed from the above compounds and a unit structure is represented by the formula, $$(R)_nSiO_{4-n/2}$$

wherein R represents both a lower alkyl radical, e.g., an alkyl radical containing from 1 to 7 carbon atoms, such as methyl, ethyl, butyl, hexyl, etc. radicals and chlorinated phenyl radicals in which the chlorinated phenyl radicals contain an average of from 1 to 5 chlorine atoms per phenyl nucleus, and the chlorinated phenyl radicals constitute from 1 to 10 percent of the total number of alkyl and chlorophenyl radicals, and $n$ has an average value of from about 2.01 to 2.5 the (lower) alkylchlorophenyl polysiloxane fluid having a viscosity of from about 10 to 100,000 centipoises, e.g. from 15 to 5,000 centipoises when measured at 25° C. The preferred alkylchlorophenyl organopolysiloxane fluids according to this invention are the methylchlorophenyl silicones; they can be prepared by the various methods, all known to those skilled in the art. Details on the preparation and properties are given, for example, in "Introduction to the Chemistry of the Silicones," E. G. Rochow, second edition (1951), John Wiley and Sons, New York, and "Organosilicone Compounds," C. Eaborn (1960), Academic Press, New York. The lower alkyl chlorophenyl-polysiloxane fluids have a viscosity in the range of about 30 to 1,000 centipoises when measured at 25° C.

A full understanding of the invention will be had by reference to the following specific examples and tests.

HIGH TEMPERATURE GELLING TEST

This test determines the ability of a silicone fluid to remain in a fluid state, i.e. resist gelation at 500° F. in the presence of air. The test procedure is as follows:

A sample of the fluid is placed in an oven and maintained at 500° F. under forced air circulation. The fluidity of the sample is observed periodically until the sample shows no gravity flow. The elapsed time (from the beginning of the test) to this point is then recorded as the "gel time" of the sample.

*Example 1*

The base silicone fluid was methylchlorophenylsilicone which had a molecular weight of about 3000. The silicone had an evaporation loss of 2.1% after 22 hours at 400° F., a pour point of below −99° F., a chlorine content of 7.2%, and kinematic viscosities as follows:

At (° F.)—                                   Centistokes
−65 _____ 2024
100 _____ 45.2
210 _____ 15.1

Into this base fluid was dispersed about 0.1% by weight of a finely divided iron oxide (0.001% to 1% of less than 0.5 micron particle size). This composition was subjected to the high temperature gelling test and exhibited a "gel time" of 70 hours. The base fluid was also tested alone without the finely divided iron oxide; the gel time was less than 70 hours.

*Examples 2 to 6*

To samples of the composition of Example 1, were added varying amounts of the specific additives of this invention. The compositions were also tested in the gelling test at 500° F. The results are tabulated below:

GEL TIME OF AN IRON-OXIDE CONTAINING SILICONE LUBRICANT WITH S-CONTAINING ADDITIVES

| Examples | Additives | Percent | Gel Time at 500° F., hrs. |
|---|---|---|---|
|  | None | 0 | 70 |
| 2 | Thiophenol | 4.1 | 288 |
| 3 | Diphenylthiourea | 4.7 | 288 |
| 4 | Diphenyldisulfide | 7.1 | 237 |
| 5 | Sodium mercaptobenzo-thiazole | 4.4 | 213 |
| 6 | Tetraethyl thiuramdisulfide | 4.2 | 213 |

The base fluid was tested with a representative of the additives in this invention, namely, diphenylthiourea with 4.7% by weight without iron oxide; the gel time was less than 70 hours.

The foregoing tests illustrate that uninhibited silicones have short service life at high temperatures. Silicone fluids containing a conventional stabilizer iron oxide, have slightly extended life. However, the sulfur containing compositions of my invention are valuable and significantly long-lived high temperature silicone fluids. It should be understood that these sulfur compounds may be used alone in the silicone fluid or in conjunction with any of the other previously disclosed additives which may be also added to the composition, as the case of the iron compounds. These fluids may be useful, not only as lubricants or hydraulic fluids, but also as heat transfer media or wherever extended service of a fluid at extremely high temperatures are desirable.

These fluids may also be thickened into lubricating greases by the addition of known pigment thickeners. Chief among these are the perylimids which have the structure

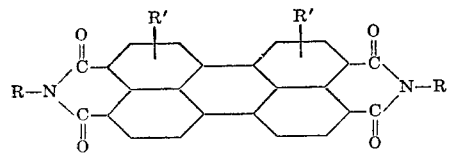

wherein R and R' may be hydrogen, alkyl, aryl, alkaryl, and halogen derivatives thereof, and may be alike or different. Another suitabe thickener are the anthanthrones:

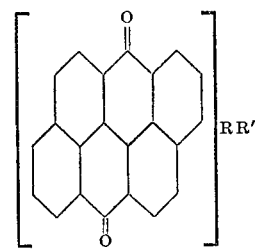

wherein R and R' are the same or different, being halogen, alkyl, aryl, alkoxy, and halogen derivatives thereof. Also suitable are azoles, naphthalic imidazoles, Milori blues (ferrocyanides), indathrene blue pigment or vat dye, polyaryl ureas, ammeline and hydrophobic clays. One or several of these thickeners may be used together and they may represent about 5% to 75% by weight, and preferably about 15% to 30% of the total composition. The remainder of the grease composition is the silicone and sulfur-containing substance of this invention.

Other additives may be present in the liquid or grease compositions, such as detergents, auxiliary load-carrying agents and the like.

I claim:

1. A high-temperature stabilized methylchlorophenyl polysiloxane fluid containing a minor amount of a finely divided iron oxide and from about 0.01% to 10% by weight of thiophenol.

2. A high-temperature stabilized methylchlorophenyl polysiloxane fluid containing a minor amount of a finely divided iron oxide and from about 0.01% to 10% by weight of diphenylthiourea.

3. A high-temperature stabilized methylchlorophenyl polysiloxane fluid containing a minor amount of a finely divided iron oxide and from about 0.01% to 10% by weight of diphenyldisulfide.

4. A high-temperature stabilized methylchlorophenyl polysiloxane fluid containing a minor amount of a finely divided iron oxide and from about 0.01% to 10% by weight of tetraethylthiuramdisulfide.

5. A high-temperature stabilized methylchlorophenyl polysiloxane fluid containing a minor amount of a finely divided iron oxide and from about 0.01% to 10% by weight of sodium mercaptobenzothiazole.

6. A high temperature silicone fluid composition comprising a major proportion of a silicone fluid having the unit structure $$R_nSiO_{4-n/2}$$ 

wherein R is selected from the group of alkyl, aryl, alkaryl, aralkyl, halogenated derivatives thereof, and mixtures of the said groups, and $n$ is 1 to 3, and a minor proportion sufficient to provide stability thereto of (1) a sulfur compound selected from the group consisting of diphenylthiourea, thiophenol, diphenyldisulfide, tetraethylthiuramdisulfide and sodium mercaptobenzothiazole and (2) an iron-containing compound selected from the group consisting of finely-divided iron oxide and salts of aliphatic carboxylic acids.

7. The composition of claim 6 wherein the iron-containing compound is finely-divided iron oxide.

8. The composition of claim 6 wherein the R groups are a mixture of alkyl and aryl radicals, and the aryl radicals are selected from the group consisting of phenyl and chlorophenyl.

9. The composition of claim 6 wherein at least one R is a methyl group and the remaining R groups are selected from the group consisting of alkyl and aryl radicals.

10. The composition of claim 7 wherein the sulfur compound is diphenylthiourea.

11. The composition of claim 7 wherein the sulfur compound is diphenyldisulfide.

12. The composition of claim 7 wherein the sulfur compound is sodium mercaptobenzothiazole.

References Cited

UNITED STATES PATENTS

| | | | |
|---|---|---|---|
| 2,081,886 | 5/1937 | Story et al. | 252—47 |
| 2,138,039 | 11/1938 | Nitardy | 252—397 |
| 2,160,172 | 5/1939 | Rosen et al. | 252—400 |
| 2,224,158 | 12/1940 | Marks et al. | 252—47 |
| 2,257,890 | 10/1941 | Sloane | 252—45 |
| 3,103,491 | 9/1963 | Wright | 252—49.6 |
| 3,130,159 | 4/1964 | Stedt | 252—47.5 |

DANIEL E. WYMAN, *Primary Examiner.*

L. G. XIARHOS, W. H. CANNON,

*Assistant Examiners.*